(12) United States Patent
Rosner et al.

(10) Patent No.: US 10,947,423 B2
(45) Date of Patent: Mar. 16, 2021

(54) OIL RESISTANT ADHESIVE

(71) Applicant: 3M INNOVATIVE PROPERTIES COMPANY, St. Paul, MN (US)

(72) Inventors: Robert B. Rosner, Austin, TX (US); Joshua R. Wurst, North St. Paul, MN (US); Robert J. Shimanek, III, Round Rock, TX (US); Rhesa M. Browning, Austin, TX (US); Ann R. Fornof, Austin, TX (US); Dong-Wei Zhu, North Oaks, MN (US); Adam R. Wohl, Mahtomedi, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 228 days.

(21) Appl. No.: 16/080,320

(22) PCT Filed: Feb. 3, 2017

(86) PCT No.: PCT/US2017/016336
§ 371 (c)(1),
(2) Date: Aug. 28, 2018

(87) PCT Pub. No.: WO2017/155644
PCT Pub. Date: Sep. 14, 2017

(65) Prior Publication Data
US 2019/0092979 A1 Mar. 28, 2019

Related U.S. Application Data

(60) Provisional application No. 62/306,172, filed on Mar. 10, 2016.

(51) Int. Cl.
| | | |
|---|---|---|
| *C09J 7/38* | (2018.01) | |
| *C08F 220/14* | (2006.01) | |
| *C08F 220/12* | (2006.01) | |
| *C09J 7/25* | (2018.01) | |
| *C09J 7/21* | (2018.01) | |
| *C09J 133/26* | (2006.01) | |
| *C09J 133/02* | (2006.01) | |
| *C09J 133/06* | (2006.01) | |
| *C08F 220/20* | (2006.01) | |
| *C08F 218/08* | (2006.01) | |
| *C08F 220/18* | (2006.01) | |
| *C08F 220/28* | (2006.01) | |

(52) U.S. Cl.
CPC ............ *C09J 7/385* (2018.01); *C08F 220/12* (2013.01); *C08F 220/14* (2013.01); *C09J 7/21* (2018.01); *C09J 7/255* (2018.01); *C09J 133/02* (2013.01); *C09J 133/066* (2013.01); *C09J 133/26* (2013.01); *C08F 218/08* (2013.01); *C08F 220/18* (2013.01); *C08F 220/20* (2013.01); *C08F 220/281* (2020.02); *C08F 2800/20* (2013.01); *C08F 2810/20* (2013.01); *C08L 2312/00* (2013.01); *C09J 2301/408* (2020.08); *C09J 2301/414* (2020.08); *C09J 2400/143* (2013.01); *C09J 2433/00* (2013.01)

(58) Field of Classification Search
None
See application file for complete search history.

(56) References Cited

U.S. PATENT DOCUMENTS

| | | |
|---|---|---|
| 2,601,016 A | 6/1952 | Hendricks |
| 3,018,262 A | 1/1962 | Schroeder |
| 3,298,998 A | 1/1967 | McConnell |
| 3,307,690 A | 3/1967 | Bond |
| 3,356,635 A | 12/1967 | Heer |
| 3,632,412 A | 1/1972 | Blance |
| 3,632,413 A | 1/1972 | Blance |
| 4,504,642 A | 3/1985 | Ohmori |
| 4,619,979 A | 10/1986 | Kotnour |
| 4,843,134 A | 6/1989 | Kotnour |
| 5,637,646 A | 6/1997 | Ellis |
| 5,804,610 A | 9/1998 | Hamer |
| 6,132,844 A | 10/2000 | Altshuler |
| 6,444,772 B1 | 9/2002 | McGinniss |
| 7,968,661 B2 | 6/2011 | Ellis |
| 2008/0286485 A1 | 11/2008 | Zollner |
| 2011/0054115 A1* | 3/2011 | Erdogan ............... C09J 133/08 524/556 |

FOREIGN PATENT DOCUMENTS

| | | |
|---|---|---|
| CN | 101165132 | 4/2008 |
| CN | 102040930 | 5/2011 |
| CN | 102101996 | 6/2011 |
| CN | 102127381 | 7/2011 |
| CN | 103642413 | 3/2014 |
| CN | 103965815 | 8/2014 |

(Continued)

OTHER PUBLICATIONS

Billmeyer, Jr. "Textbook of Polymer Science", Wiley-Interscience, Second Edition, 1971, pp. 84-85.

(Continued)

*Primary Examiner* — Shawn Mckinnon

(74) *Attorney, Agent, or Firm* — Janet A. Kling

(57) ABSTRACT

The present disclosure provides an oil-resistant adhesive comprising a crosslinked copolymer of (meth)acrylic ester monomers, methyl (meth)acrylate monomers, vinyl ester monomers, and a functional monomer selected from one of (meth)acrylic acid, a (meth)acrylamide or a hydroxyalkyl (meth)acrylate monomers.

17 Claims, No Drawings

(56) References Cited

FOREIGN PATENT DOCUMENTS

| CN | 104194679 | 12/2014 |
|---|---|---|
| DE | 4324357 | 11/1994 |
| EP | 1674544 | 6/2006 |
| EP | 2607443 | 6/2013 |
| EP | 2871220 | 5/2015 |
| JP | 2001172578 | 6/2001 |
| JP | 4511660 | 7/2010 |
| JP | 5411660 | 2/2014 |
| KR | 100952416 | 4/2010 |
| WO | WO 2014-156642 | 10/2014 |

OTHER PUBLICATIONS

Pocius, "Adhesion and Adhesives Technology: An Introduction", Second Edition, 2002, pp. 1-8.
International Search Report for PCT International Application No. PCT/US2017/016336, dated May 12, 2017, 4 pages.

\* cited by examiner

OIL RESISTANT ADHESIVE

CROSS REFERENCE TO RELATED APPLICATIONS

This application is a national stage filing under 35 U.S.C. 371 of PCT/US2017/016336, filed Feb. 3, 2017, which claims the benefit of U.S. Application No. 62/306,172, filed Mar. 10, 2016, the disclosure of which is incorporated by reference in its/their entirety herein.

BACKGROUND

Pressure-sensitive tapes are virtually ubiquitous in the home and workplace. In its simplest configuration, a pressure-sensitive tape comprises an adhesive and a backing, and the overall construction is tacky at the use temperature and adheres to a variety of substrates using only moderate pressure to form the bond. In this fashion, pressure-sensitive tapes constitute a complete, self-contained bonding system.

According to the Pressure-Sensitive Tape Council, pressure-sensitive adhesives (PSAs) are known to possess properties including the following: (1) aggressive and permanent tack, (2) adherence with no more than finger pressure, (3) sufficient ability to hold onto an adherend, and (4) sufficient cohesive strength to be removed cleanly from the adherend. Materials that have been found to function well as PSAs include polymers designed and formulated to exhibit the requisite viscoelastic properties resulting in a desired balance of tack, peel adhesion, and shear holding power. PSAs are characterized by being normally tacky at room temperature (e.g., 20° C.). PSAs do not embrace compositions merely because they are sticky or adhere to a surface.

These requirements are assessed generally by means of tests which are designed to individually measure tack, adhesion (peel strength), and cohesion (shear holding power), as noted in A.V. Pocius in Adhesion and Adhesives Technology: An Introduction, $2^{nd}$ Ed., Hanser Gardner Publication, Cincinnati, Ohio, 2002. These measurements taken together constitute the balance of properties often used to characterize a PSA.

In many applications adhesives may be exposed to oily substrates or environments. The presence of oil can retard adhesion to oily substrates, and exposure to oil can saturate an adhesive causing a loss of cohesive strength and adhesion, particularly at elevated temperatures. When used in a transformer, an adhesive can also contaminate the transformer oil, degrading the oil's insulting properties. Such contamination can lead to decreased lifespan of a transformer or catastrophic failure.

Many adhesives described as oil-resistant are two-phase rubbers such as styrene-butadiene block copolymers (SBR) and rubbers known for oil resistance such as nitrile or nitrile butadiene (NBR) rubbers. CN102127381 (YE JINBIAO) uses SEBS rubber with oil and filler to achieve water and oil resistance for stickers and labels. In U.S. Pat. No. 2,601,016 (3M), the adhesive contains 10-40% acrylonitrile with 60-90% of other copolymerizable monomers such as butene. CN 103642413 (KUNSHAN HANBAO TAPE TECHNOLOGY) describes tape specifically designed for oil transformers with Nomex paper backing and an adhesive made from organosilicone and epoxy.

US330769 (3M) describes an oil-resistant, non-contaminating contact adherent adhesive tape comprising 50 to 100 parts by weight of a thermoplastic base polymer selected from the group consisting of copolymers of alkyl acrylates with one another and with acrylic acid, and alkyl acrylate-vinyl acetate copolymers, and from 2 to about 50 parts of an organic polymeric cross-linker for cross linking and about 0.5 to about 10 parts of a heat-activated crosslinking catalyst for cross-linking agent.

SUMMARY

The pressure-sensitive adhesives of this disclosure provide the desired balance of tack, peel adhesion, and shear holding power, and further conform to the Dahlquist criteria; i.e. the modulus of the adhesive at the application temperature, typically room temperature, is less than $3 \times 10^5$ Pascal at a frequency of 1 Hz.

The adhesives of the present disclosure are particularly useful for maintaining adhesion in oily environments, and further exhibit exceptional cohesive strength in oily environments at elevated temperatures.

The crosslinked adhesive compositions are oil resistant; that is they maintain their adhesive properties in oily environments. When used in a tape construction which includes Kraft paper or polyester backing reinforced with glass fibers the resulting tape shows excellent holding power when immersed in hot mineral oil and does not cause excess contamination of the oil as determined by ASTM 3455 "Standard Test Method for Compatibility of Construction Material with Electrical Insulating Oil of Petroleum Origin".

The present disclosure provides an oil-resistant adhesive comprising a crosslinked copolymer of (meth)acrylic ester monomers, methyl (meth)acrylate monomers, vinyl ester monomers, and a functional monomer selected from one of (meth)acrylic acid, a (meth)acrylamide or a hydroxyalkyl (meth)acrylate monomers.

DETAILED DESCRIPTION

The (meth)acrylate ester monomer used in preparing the copolymer is a monomeric (meth)acrylic ester of a non-tertiary alcohol, which alcohol contains from 2 to 14 carbon atoms and preferably an average of from 4 to 12 carbon atoms and more preferably 6 to 12 carbon atoms.

Examples of monomers suitable for use as the (meth) acrylate ester monomer include the esters of either acrylic acid or methacrylic acid with non-tertiary alcohols such as ethanol, 1-propanol, 2-propanol, 1-butanol, 2-butanol, 1-pentanol, 2-pentanol, 3-pentanol, 2-methyl-1-butanol, 3-methyl-1-butanol, 1-hexanol, 2-hexanol, 2-methyl-1-pentanol, 3-methyl-1-pentanol, 2-ethyl-1-butanol, 3,5,5-trimethyl-1-hexanol, cyclohexanol, 3-heptanol, 1-octanol, 2-octanol, isooctylalcohol, 2-phenylethanol, 2-ethyl-1-hexanol, 1-decanol, 2-propylheptanol, (iso)borneol, 1-dodecanol, 1-tridecanol, 1-tetradecanol, citronellol, dihydrocitronellol, and the like. In some embodiments, the preferred (meth) acrylate ester monomer is the ester of (meth)acrylic acid with butyl alcohol or isooctyl alcohol, or a combination thereof, although combinations of two or more different (meth)acrylate ester monomer are suitable. In some embodiments, the preferred (meth)acrylate ester monomer is the ester of (meth)acrylic acid with an alcohol derived from a renewable source, such as 2-octanol, citronellol, dihydrocitronellol.

The (meth)acrylate ester monomer is present in an amount of 30 to 60 parts by weight based on 100 parts total monomer content used to prepare the copolymer. Preferably (meth) acrylate ester monomer is present in an amount of 35-50 parts by weight, most preferably 4-45 parts by weight, based on 100 parts total monomer The copolymer generally comprises 30 to 70 parts by weight of methyl (meth)acrylate, preferably 40 to 60 parts by weight, based on 100 parts total monomer.

The adhesive copolymer further comprises vinyl ester monomers of the general formula:

wherein $R^5$ is selected from the group consisting of linear or branched alkyl groups having 1 to 12 carbon atoms, preferably 1-4 carbons, most preferably one carbon (vinyl acetate). Such vinyl esters include but are not limited to those selected from the group consisting of vinyl acetate, vinyl 2-ethylhexanoate, vinyl caprate, vinyl laurate, vinyl pelargonate, vinyl hexanoate, vinyl propionate, vinyl decanoate, vinyl octanoate, and other monofunctional unsaturated vinyl esters of linear or branched carboxylic acids comprising 2 to 13 carbon atoms. Preferred vinyl ester monomers include those selected from the group consisting of vinyl laurate, vinyl caprate, vinyl-2-ethylhexanoate, and mixtures thereof.

The copolymer generally comprises 2 to 15 parts by weight of vinyl ester monomers, preferably 5 to 10 parts by weight, based on 100 parts of total monomer. It has been found that the vinyl ester monomers improve the interfacial tension performance of the adhesives. It will be understood that the vinyl groups of the vinyl esters are generally less reactive than (meth)acryloyl group of the other monomers in free radical polymerization, so higher amounts of these monomers may be used in the feed to achieve the desired levels in the copolymer.

The copolymer comprises one of (meth)acrylamide monomers, acid functional monomers or hydroxyalkyl (meth)acrylate monomers. These monomers are used in amounts of 0.1 to 5, preferably 0.5 to 2, parts be weight, relative to 100 parts total monomer.

In one embodiment, the copolymer comprises a (meth) acrylamide monomer, including (meth)acrylamide per se, and mono- or di-N-alkyl substituted acrylamide, The (meth) acrylamide monomer has the general formula:

where $R_1$ is H or $C_1$-$C_4$ alkyl, $R^3$ and $R^4$ are each independently is hydrogen or an alkyl group having from 1 to 10 carbon atoms Preferably, the sum of carbon atoms of $R^3$ and $R^4$ are ≤8.

Examples of useful (meth)acrylamide monomers include (meth)acrylamide, N-ethyl (meth)acrylamide, N-butyl (meth)acrylamide, N-t-butyl acrylamide; N-decyl (meth) acrylamide, N-ethyl (meth)acrylamide, N-butyl (meth)acrylamide, N-decyl (meth)acrylamide, diacetone (meth)acrylamide, N-tert-octyl (meth)acrylamide, N,N-dimethyl(meth) acrylamide, and N-morpholino (meth)acrylamide. N—N-(mono- or di-lower alkyl ($C_1$ to $C_5$)) (meth)acrylamides, N-methyl (meth)acrylamide, N,N-dimethyl (meth)acrylamides, and mixtures thereof.

The copolymers containing the (meth)acrylamide monomers may be crosslinked by exposure to e-beam. E-Beam radiation is advantageous as a method of crosslinking because it is effective to crosslink adhesive copolymers that have high amounts of pigments or fillers, and/or adhesive film layers of greater thicknesses. The use of e-beam does not require the use of crosslinking agents, catalysts or initiators to effect crosslinking. The use of e-beam allows crosslinking at lower temperatures, obviates the need of compounding thermally sensitive chemical crosslinking agents in the melt processed composition, provides more uniform cure to thicker adhesive layers. Further, the crosslinked adhesive is not contaminated with the residue of chemical crosslinking agents.

The irradiation conditions for the electron beam need only be sufficient to generate radicals on the extruded composition and will depend on the types and thicknesses of the material and the degree of crosslinking desired, but the irradiation will generally be conducted with at least 10 keV of an acceleration electric field, and at least 10 kGy of a dose. It is preferably 50-200 keV of an acceleration electric field, and 30-1000 kGy of a dose. A variety of procedures for E-beam curing are well-known. The cure depends on the specific equipment used to deliver the electron beam, and those skilled in the art can define a dose calibration model for the equipment used. Commercially available electron beam generating equipment are readily available. For example, the radiation processing may be performed on a Model CB-300 electron beam generating apparatus (available from Energy Sciences, Inc. (Wilmington, Mass.).

Generally, a layer of the copolymer is coated on a substrate, such as a backing layer, runs through an inert chamber and exposed to e-beam. In some embodiments, a layer of uncured material with a liner (e.g., a release liner) on both sides ("closed face") may be attached to the support film and conveyed at a fixed speed of about 6.1 meters/min (20 feet/min). In some embodiments, a sample of the uncured material may be applied to one liner, with no liner on the opposite surface ("open face"). The uncured material may be exposed to E-beam irradiation from one side through the release liner. A single pass through the electron beam equipment may be sufficient but thicker samples may exhibit a cure gradient through the cross section of the tape so that it may be desirable to expose the uncured material to electron beam radiation from both sides. Thus, in preferred embodiments, the adhesive copolymer composition is laminated or otherwise coated on a substrate, backing or liner, and crosslinked by e-beam. In other preferred embodiments, the adhesive copolymer composition is coextruded with a substrate, backing or liner, and crosslinked by e-beam.

The adhesive copolymer may comprise an acid functional monomer, where the acid functional group may be an acid per se, such as a carboxylic acid, or a portion may be salt thereof, such as an alkali metal carboxylate. Useful acid functional monomers include, but are not limited to, those selected from ethylenically unsaturated carboxylic acids, ethylenically unsaturated sulfonic acids, ethylenically unsaturated phosphonic acids, and mixtures thereof. Examples of such compounds include those selected from acrylic acid, methacrylic acid, itaconic acid, fumaric acid, crotonic acid, citraconic acid, maleic acid, oleic acid, β-carboxyethyl (meth)acrylate, 2-sulfoethyl methacrylate, styrene sulfonic acid, 2-acrylamido-2-methylpropanesulfonic acid, vinylphosphonic acid, and mixtures thereof.

Due to their availability, acid functional monomers of the acid functional copolymer are generally selected from ethylenically unsaturated carboxylic acids, i.e. (meth)acrylic acids. When even stronger acids are desired, acidic monomers include the ethylenically unsaturated sulfonic acids and ethylenically unsaturated phosphonic acids. The acid functional monomer, when present, is generally used in amounts of 0.1 to 5 parts by weight, preferably 0.5 to 2 parts by weight, based on 100 parts by weight total monomer.

The acid-functional copolymers are crosslinked using a multifunctional crosslinking agent having functional groups that are coreactive with the pendent acid groups. It is preferred that the nucleophile-electrophile combinations react by an addition reaction in which no by-product molecules are created. More specifically, the crosslinking agent may be any electrophilic functional group that is coreactive with the acid group, including hydroxyl, amino, epoxy, or oxazolinyl groups.

For example, the crosslinking agent for an acid-functional copolymer may comprise a polyepoxy compound including both aliphatic and aromatic polyepoxides, but glycidyl aliphatic epoxides are preferred.

The aromatic polyepoxides are compounds containing at least one aromatic ring structure, e.g. a benzene ring, and more than one epoxy group. Preferred aromatic polyepoxides include the polyglycidyl ethers of polyhydric phenols (e.g., bisphenol A derivative resins, epoxy cresol-novolac resins, bisphenol F derivative resins, epoxy phenol-novolac resins) and the glycidyl esters of aromatic carboxylic acids. The most preferred aromatic polyepoxides are the polyglycidyl ethers of polyhydric phenols.

Representative examples of aliphatic polyepoxides which can be utilized in the composition of the invention include 3',4'-epoxycyclohexylmethyl-3,4-epoxycyclohexanecarboxylate, 3,4-epoxycyclohexyloxirane, 2-(3',4'-epoxycyclohexyl)-5,1H-spiro-3H4H-epoxycyclohexane-1,3-dioxane, bis(3,4-epoxycyclohexylmethyl)adipate, the diglycidyl ester of linoleic dimer acid, 1,4-bis(2,3-epoxypropoxy)butane, 4-(1,2-epoxyethyl)-1,2-epoxycyclohexane, 2,2-bis(3,4-epoxycyclohexyl)propane, polyglycidyl ethers of aliphatic polyols such as glycerol or hydrogenated 4,4'-dihydroxydiphenyl-dimethylmethane, and mixtures thereof.

Representative examples of aromatic polyepoxides which can be utilized in the composition of the invention include glycidyl esters of aromatic carboxylic acids, e.g., phthalic acid diglycidyl ester, isophthalic acid diglycidyl ester, trimellitic acid triglycidyl ester, and pyromellitic acid tetraglycidyl ester, and mixtures thereof; N-glycidylaminobenzenes, e.g., N,N-diglycidylbenzeneamine, bis(N,N-diglycidyl-4-aminophenyl)methane, 1,3-bis(N,N-diglycidylamino)benzene, and N,N-diglycidyl-4-glycidyloxybenzeneamine, and mixtures thereof; and the polyglycidyl derivatives of polyhydric phenols, e.g., 2,2-bis-(4-(2,3-epoxypropoxy)phenyl-propane, the polyglycidyl ethers of polyhydric phenols such as tetrakis(4-hydroxyphenyl)ethane, pyrocatechol, resorcinol, hydroquinone, 4,4'-dihydroxydiphenyl methane, 4,4'-dihydroxydiphenyl dimethyl methane, 4,4'-dihydroxy-3,3'-dimethyldiphenyl methyl methane, 4,4'-dihydroxydiphenyl methyl methane, 4,4'-dihydroxydiphenyl cyclohexane, 4,4'-dihydroxy-3,31-dimethyldiphenyl propane, 4,4'-dihydroxydiphenyl sulfone, and tris-(4-hydroxyphenyl)methane, polyglycidyl ethers of novolacs (reaction products of monohydric or polyhydric phenols with aldehydes in the presence of acid catalysts), and the derivatives described in U.S. Pat. Nos. 3,018,262 and 3,298,998, as well as the derivatives described in the Handbook of Epoxy Resins by Lee and Neville, McGraw-Hill Book Co., New York (1967), and mixtures thereof.

A preferred class of polyepoxy compounds are polyglycidyl ethers of polyhydric alcohol, particularly polyphenols. The glycidyl epoxy compounds are generally more reactive toward amines than cycloaliphatic epoxy compounds. In some preferred embodiments, the epoxy compound generally has an epoxy equivalent weight (EW) of between 170 to about 4,000, preferably between 170 and 1,000. The epoxide equivalent weight (EW) is defined as the weight in grams of the epoxy functional compound that contains one gram equivalent of epoxy functional groups.

Alternative to the epoxy crosslinking agents, the acid functional copolymers may be crosslinked with bisamide crosslinking agents of the formula

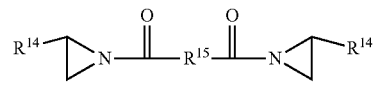

Where each R" is independently selected from the group consisting of H and $C_nH_{2n+1}$, where n is an integer ranging from 1 to 5, $R^{15}$ is a divalent radical selected from the group consisting of phenyl, substituted phenyl, triazine, and —$C_mH_{2m}$—, where m is an integer ranging from 1 to 10, and combinations thereof.

Alternatively the acid functional copolymers may be crosslinked with multifunctional oxazoline crosslinking agents useful in this invention are those that contain two or more groups per molecule selected from the group consisting of 2-oxazolines, 2 oxazines and combinations thereof. Preferred 1,3-oxazyl heterocyclic compounds are 1,3-oxazolines, and a particularly preferred 1,3-oxazoline is 2-phenyl-2-oxazoline. Bisoxazolines are typically derived from polycarboxylic acids and such polycarboxylic acids include, but are not limited to aromatic acids; for example, isophthalic acid, terephthalic acid, 5-t-butylisophthalic acid, trimesic acid, 1,2,4,5-benzenetetracarboxylic acid and 2,6-naphthalene dicarboxylic acid. The preferred polycarboxylic acids include isophthalic acid, terephthalic acid and trimesic acid.

Polyfunctional 1,3-oxazyl heterocyclic compounds useful in this invention can be conveniently prepared by the reaction of the corresponding esters of a polycarboxylic acids and alkanolamines. Nonlimiting examples of poly(1,3-oxazyl heterocyclic) compounds including bisoxazolines are those having a nucleus represented by the following formula:

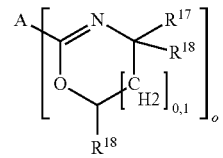

wherein A is selected from the group consisting of a cyclic or acyclic aliphatic or substituted cyclic or acyclic aliphatic moiety having from 1 to 20 carbon atoms or an aromatic (aryl) mono- or multinuclear or aliphatic substituted aryl residue having from 6 to 20 carbon atoms;
$R^{17}$ independently represents H, $CH_3$, $CH_2CH_3$, or phenyl;
each $R^{18}$ is independently represent H or $CH_3$;
subscript o is an integer of 2 or more, preferably 2 or 3.

Useful multifunctional oxazoline crosslinking agents include but is not limited to 4,4'-5,5'-tetrahydro-2,2'-bisoxazole, (that is, 2,2'-bis(2-oxazoline)); 2,2'-(alkanediyl)bis[4,5-dihydrooxazole], for example, 2,2'-(1,4-butanediyl)bis[4,5-dihydrooxazole] and 2,2'-(1,2-ethanediyl)bis[4,5-dihydrooxazole]; 2,2'-(arylene)bis[4,5-dihydrooxazole], e.g., 2,2'-(1,4-phenylene)bis[4,5-dihydrooxazole]; naphthalenyl)bis[4,5-dihydrooxazole] and 2,2'-(1,8-anthracenyl)bis[4,5-dihydrooxazole]; sulfonyl, oxy, thio or alkylene bis 2-(arylene)[4,5-dihydrooxazole], for example, sulfonyl bis 2-(1,4-phenylene)bis[4,5-dihydrooxazole], oxybis 2-(1,4-phenylene)bis[4,5-dihydrooxazole], thiobis 2-(1,4-phenylene)bis[4,5-dihydrooxazole] and methylene bis 2-(1,4-phenylene)bis[4,5-dihydrooxazole]; 2,2',2"-(arylene tris[4,5-dihydrooxazole], e.g., 2,2',2"-(1,3,5-phenylene tris[4,5-dihydrooxazole]; 2,2',2", 2'"-(arylene tetra[4,5- dihydrooxazole], for example, 2,2',2'',2'''-(1,2,4,5-phenylene tetra[4,5-dihydrooxazole] and oligomeric and polymeric materials having terminal oxazoline groups.

In some embodiments, the adhesive copolymer comprises hydroxyalkyl (meth)acrylates, including acrylates or a methacrylate having a the hydroxy substituted alkyl group of 1 to 10, 1 to 6, or 1 to 4 carbon atoms. Useful hydroxyalkyl (meth)acrylates includes, for example, 2-hydroxyethyl (meth)acrylate, 2-hydroxypropyl (meth)acrylate and 2-hydroxymethyl (meth)acrylate. The hydroxyalkyl (meth)acrylates may be used in amounts of 0.1 to 5, preferably 0.5 to 2 parts by weight, relative to 100 parts total monomer.

The adhesive copolymers having hydroxyalkyl monomer units are crosslinked using a multifunctional crosslinking agent having functional groups that are coreactive with the pendent hydroxyl groups. It is preferred that the nucleophile-electrophile combinations react by an addition reaction in which no by-product molecules are created More specifically, the crosslinking agent may be any electrophilic functional group that is coreactive with the nucleophilic hydroxyl group, including oxazolinyl-, epoxy acid halide, isocyanate-, and anhydride-functional groups For example, the hydroxy-functional copolymer may be crosslinked by a polyisocyanate. Suitable polyisocyanates may include aromatic isocyanates, aliphatic isocyanates, polyisocyanates, or combinations thereof. Suitable aromatic isocyanates may include Methylene diphenyl diisocyanate, 1,4-Phenylene diisocyanate, 1,3-Phenylene diisocyanate, 3,3'-Dimethyl diphenylmethane-4,4'-diisocyanate, Diphenylmethane-2,2'-diisocyanate, naphthalene diisocyanate, 4,4'-Biphenyldiisocyanate, 1,5-Naphthalene Diisocyanate, 2-Methyl-1,5-naphthalene diisocyanate, 2,4-toluene diisocyanate and 2,6-toluene diisocyanate and mixtures of the two isomers, diphenylmethane-2,4'-diisocyanate, 4-Ethyl-m-phenylenediisocyanate, and the like, or mixtures thereof. Suitable aliphatic isocyanates may include 2,4,4-Trimethylhexamethylene diisocyanate, 2,2,4-Trimethylhexamethylene diisocyanate, 1,4-Cyclohexane diisocyanate, 1,3-cyclohexyl diisocyanate, Trimethylhexamethylene diisocyanate, Isophorone Diisocyanate (IPDI), Decamethylene diisocyanate, Methylene diisocyanate, Methylene-bis(4-Cyclohexylisocyanate) (H12MDI), dimeryl diisocyanate, trans-1,4-Cyclohexane diisocyanate, hexamethylene diisocyanate, and the like, or mixtures thereof.

When using a crosslinking agent with the acid- or hydroxyalkyl functional copolymers, the crosslinked composition is characterized as a polymer having a first polymer chain having the residue of two or more pendent, hydroxyl- or acid-functional groups chemically linked to the residue of two or more co-reactive functional groups from the crosslinking agent. Thus, during exposure to thermal energy the hydroxyl- or acid-functional group reacts with a second, co-reactive functional group pendent from the crosslinking agent to form a crosslink (linkage) between the chains. Catalysts for the crosslinking agents are known in the art and may be used.

The preferable molecular weight between crosslinks ($M_c$) will vary depending on application, where materials having higher ($M_c$) are generally softer. For example, for pressure-sensitive adhesives, the present crosslinked composition has effective molecular weight between crosslinks, ($M_c$), of greater than or equal to 1,000 and preferably greater than 3,000. Effective molecular weight between crosslinks ($M_c$), may be measured by dynamic mechanical analysis.

The number and concentration of pendent hydroxyl- or acid-functional groups that are pendent from polymer chains may easily control the degree of crosslinking. In general, the smaller the Mc, the lower the elasticity and hence harder the film. On the other hand, films having a lower degree of crosslinking exhibit greater flexibility. Use of a stoichiometric excess of a component containing a functional group or a co-reactive functional group may be useful to achieve control over the extent of reaction between the reactive and co-reactive functional groups, under the above specified conditions, and thereby control the Mc. Stoichiometric excesses of even 10-fold represent minor amounts on a comparative weight basis relative to the whole composition.

The crosslinking agent is generally used in amount of 0.1 to 5 parts by weight, preferably 0.1 to 3 parts by weight, relative to 100 parts of the copolymer.

The mixture of monomers can be polymerized by techniques including, but not limited to, the conventional techniques of solvent polymerization, syrup polymerization, and solventless bulk polymerization. The monomer mixture may comprise a polymerization initiator, especially a thermal initiator or a photoinitiator of a type and in an amount effective to polymerize the co-monomers.

A typical solution polymerization method is carried out by adding the monomers, and a suitable solvent to a reaction vessel, adding a free radical initiator, purging with nitrogen, and maintaining the reaction vessel at an elevated temperature, typically in the range of about 40 to 100° C. until the reaction is completed, typically in about 1 to 20 hours, depending upon the batch size and temperature. Examples of the solvent are methanol, tetrahydrofuran, ethanol, isopropanol, acetone, methyl ethyl ketone, methyl acetate, ethyl acetate, toluene, xylene, and an ethylene glycol alkyl ether. Those solvents can be used alone or as mixtures thereof.

Suitable initiators include but are not limited to those selected from the group consisting of azo compounds such as VAZO™ 64 (2,2'-azobis(isobutyronitrile)) and VAZO™ 52 (2,2'-azobis(2,4-dimethylpentanenitrile)), both available from E.I. du Pont de Nemours Co., peroxides such as benzoyl peroxide and lauroyl peroxide, and mixtures thereof. The preferred oil-soluble thermal initiator is (2,2'-azobis(isobutyronitrile)).

When used, initiators may comprise from about 0.05 to about 1 part by weight, preferably about 0.1 to about 0.5 part by weight based on 100 parts by weight of monomer components in the pressure-sensitive adhesive.

In a typical photopolymerization method, a monomer mixture may be irradiated with ultraviolet (UV) rays in the presence of a photopolymerization initiator (i.e., photoinitiators). Useful photoinitiators include benzoin ethers such as benzoin methyl ether and benzoin isopropyl ether; substituted acetophenones such as 2, 2-dimethoxyacetophenone, available as Irgacure™ 651 photoinitiator (BASF, Ludwigshafen, Germany), 2,2 dimethoxy-2-phenyl-1-phenylethanone, available as Esacure™ KB-1 photoinitiator (Sartomer Co.; West Chester, Pa.), and dimethoxyhydroxyacetophenone; substituted α-ketols such as 2-methyl-2-hydroxy propiophenone; aromatic sulfonyl chlorides such as 2-naphthalene-sulfonyl chloride; and photoactive oximes such as 1-phenyl-1,2-propanedione-2-(O-ethoxy-carbonyl) oxime. Particularly preferred among these are the substituted acetophenones.

Preferred photoinitiators are photoactive compounds that undergo a Norrish I cleavage to generate free radicals that can initiate by addition to the acrylic double bonds. Additional photoinitiator can be added to the mixture to be coated after the copolymer has been formed.

The polymerizable composition and the photoinitiator may be irradiated with activating UV radiation to polymerize the monomer component(s). UV light sources can be of two types: 1) relatively low light intensity sources such as backlights which provide generally 10 mW/cm$^2$ or less (as measured in accordance with procedures approved by the United States National Institute of Standards and Technology as, for example, with a Uvimap™ UM 365 L-S radiometer manufactured by Electronic Instrumentation & Technology, Inc., in Sterling, Va.) over a wavelength range of 280 to 400 nanometers and 2) relatively high light intensity sources such as medium pressure mercury lamps which provide intensities generally greater than 10 mW/cm$^2$, preferably between 15 and 450 mW/cm$^2$. For example, an intensity of 600 mW/cm$^2$ and an exposure time of about 1 second may be used successfully. Intensities can range from about 0.1 to about 150 mW/cm$^2$, preferably from about 0.5 to about 100 mW/cm$^2$, and more preferably from about 0.5 to about 50 mW/cm$^2$. Such photoinitiators preferably are present in an amount of from 0.1 to 1.0 pbw per 100 pbw of the polymer composition.

The curable composition may also be prepared by a syrup polymerization technique. "Syrup polymer composition" refers to a solution of a solute polymer in one or more solvent monomers, the composition having a viscosity of from 500 to 10,000 cPs at 22° C. Here, the monomer mixture is partially polymerized using a thermal- or photoinitiator. The resulting syrup polymer, comprising a (meth)acrylate solute copolymer and unreacted solvent monomers, is then combined with a photoinitiator, any crosslinkers, and optionally coated on a substrate. Subsequent treatment with UV radiation will simultaneously polymerize the solvent monomers and crosslink the composition.

The degree of conversion (of monomers to copolymer) can be monitored during the irradiation by measuring the index of refraction of the polymerizing mixture.

It will be understood that a syrup polymerization method will produce a "dead polymer" in the initial free radical polymerization; i.e. a polymerized, not free-radically polymerizable polymer. Subsequently the solvent monomers do not free-radically polymerize onto the extant solute copolymer. The syrup method provides advantages over solvent or solution polymerization methods; the syrup method yielding higher molecular weights. These higher molecular weights of the second step of polymerization increase the amount of chain entanglements, thus increasing cohesive strength.

Solventless polymerization methods, such as the continuous free radical polymerization method described in U.S. Pat. Nos. 4,619,979 and 4,843,134 (Kotnour et al.); the essentially adiabatic polymerization methods using a batch reactor described in U.S. Pat. Nos. 5,637,646 and 7,968,661 (Ellis); and, the methods described for polymerizing packaged pre-adhesive compositions described in U.S. Pat. No. 5,804,610 (Hamer et al.) may also be utilized to prepare the polymers. Preferably, the copolymer is prepared by the adiabatic batch polymerization process wherein the total of the absolute value of any energy exchanged to or from the batch during the course of reaction will be less than about 15% of the total energy liberated due to reaction for the corresponding amount of polymerization that has occurred during the time that polymerization has occurred, as described in U.S. Pat. Nos. 5,637,646 and 7,968,661 (Ellis), incorporated herein by reference.

The copolymer has the following general formula prior to crosslinking:

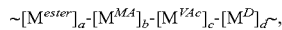

$$\sim[M^{ester}]_a\text{-}[M^{MA}]_b\text{-}[M^{VAc}]_c\text{-}[M^D]_d\sim,$$

where
[$M^{ester}$] represents (meth)acrylate ester monomer units and subscript a is the parts by weight;

[$M^{MA}$] represent methyl (meth)acrylate monomer units and subscript b is the parts by weight;
[$M^{VAc}$] represent vinyl ester monomer units and subscript c is the parts by weight; and
[$M^D$] represents one of (meth)acrylic acid, a (meth)acrylamide or a hydroxyalkyl (meth)acrylate and subscript d represents the parts by weight, the sum of subscripts a to d being 100 parts by weight.

Regardless of the method used to prepare the copolymer, it is preferred that the inherent viscosity of the copolymer, prior to crosslinking, is >0.95 to 1.4 deciliters/g, more preferably >1.0 to 1.2 and most preferably >1.1 to 1.2 when measured at 0.25 g/dL in ethyl acetate. When used in oily environments, copolymers having higher inherent viscosities have been observed to become swelled or plasticized with the mineral oil, reducing the cohesive strength leading to adhesive failure. Further, higher viscosity (or higher $M_w$) copolymers present processing challenges which may require solvent to reduce the viscosity to enable coating, which increases costs and drying times, and reduces coating thicknesses. When inherent viscosities are too low, the shear strength of the adhesive construction is impaired.

Substrate

Examples of materials that can be included in the flexible support or backing include polyolefins such as polyethylene, polypropylene (including isotactic polypropylene), polystyrene, polyester, polyvinyl alcohol, poly(ethylene terephthalate), poly(butylene terephthalate), poly(caprolactam), poly(vinylidene fluoride), polylactides, cellulose acetate, and ethyl cellulose and the like. Commercially available backing materials useful in the invention include kraft paper (available from Monadnock Paper, Inc.); cellophane (available from Flexel Corp.); spun-bond poly(ethylene) and poly(propylene), such as Tyvek™ and Typar™ (available from DuPont, Inc.); and porous films obtained from poly(ethylene) and poly(propylene), such as Teslin™ (available from PPG Industries, Inc.), and Cellguard™ (available from Hoechst-Celanese).

Backings may also be prepared of fabric such as woven fabric formed of threads of synthetic or natural materials such as cotton, nylon, rayon, glass, ceramic materials, and the like or nonwoven fabric such as air laid webs of natural or synthetic fibers or blends of these. The backing may also be formed of metal, metallized polymer films, or ceramic sheet materials may take the form of any article conventionally known to be utilized with pressure sensitive adhesive compositions such as labels, tapes, signs, covers, marking indicia, and the like.

If desired, the adhesive article further comprises a scrim layer, which may be bonded to the backing layer or embedded in the adhesive layer. The scrim provides additional mechanical support for the adhesive article and can be used to improve the tensile strength and peel performance.

The scrim layer can be a woven or nonwoven web of polymer or glass fibers, or a patterned or non-patterned array of polymer or glass fibers. Generally, a coating of the adhesive copolymer and optional crosslinker, in a solvent or as a syrup, is applied to the scrim layer such that the scrim fibers are wetted, and the copolymer crosslinked by heat or exposure to radiation, depending on the nature of the crosslinking.

The flexible support or backing may also comprise a release-coated substrate. Such substrates are typically employed when an adhesive transfer tape is provided. Examples of release-coated substrates are well known in the art and may be coated with an outer layer of a release agent such as a silicone-containing material or a fluorocarbon-containing material.

In some embodiments, such as with syrup copolymers, the syrup may be coated and cured using a construction which comprises a layer of syrup copolymer coated between two liners at least one of which is coated with a release material. The release liners typically comprise a clear polymeric material such as polyester that is transparent to ultraviolet radiation. Preferably, each release liner is first coated or primed with a release material which is incompatible with the acrylate adhesive copolymer. The adhesive composition may be cured by exposure to ultraviolet radiation which is transmitted through the release liner(s).

The above-described compositions are coated on a substrate using conventional coating techniques modified as appropriate to the particular substrate. For example, these compositions can be applied to a variety of solid substrates by methods such as roller coating, flow coating, dip coating, spin coating, spray coating knife coating, and die coating. These various methods of coating allow the compositions to be placed on the substrate at variable thicknesses thus allowing a wider range of use of the compositions. Coating thicknesses may vary as previously described.

Using the methods described in U.S. Pat. Nos. 4,619,979 and 4,843,134 (Kotnour et al.); U.S. Pat. Nos. 5,637,646 and 7,968,661 (Ellis); and U.S. Pat. No. 5,804,610 (Hamer et al.), melt coatable adhesive compositions may be prepared. This hot melt adhesive may be used to form a pressure sensitive adhesive sheet by coating the melted adhesive and its packaging material onto a sheet material or another suitable substrate. The sheet material is preferably selected from a tape backing or a release liner. Preferably, the polymerized adhesives are hot melt coated by putting the packaged adhesive in a hot melt coater at a temperature sufficient to melt the packaged adhesive and with sufficient mixing to form a coatable mixture, which is coated onto a substrate. This step can be done conveniently in a heated extruder, bulk tank melter, melt-on-demand equipment, or a hand-held hot melt adhesive gun.

For any of these embodiments, the coatable adhesive can then be delivered out of a film die, subsequently contacting the drawn adhesive to a moving plastic web or other suitable substrate. A related coating method involves extruding the coatable hot melt adhesive and a coextruded backing material from a film die and cooling the layered product to form an adhesive tape. Other forming methods involve directly contacting the coatable hot melt adhesive to a rapidly moving plastic web or other suitable preformed substrate. Using this method, the adhesive blend is applied to the moving preformed web using a die having flexible die lips, such as a rotary rod die. After forming by any of these continuous methods, the adhesive films or layers can be solidified by quenching using both direct methods (e.g., chill rolls or water baths) and indirect methods (e.g., air or gas impingement).

Adhesive copolymers prepared by solution polymerization may be combined with the crosslinking agent (if any), coated on a substrate or release liner, and heated to evaporate the solvent and effect the crosslinking.

The instant adhesive and adhesive articles are suited to the manufacture of transformers in which components of the transformer are secured within the transformer housing with the adhesive article, then the transformer is filled with mineral oil. In such environments the adhesion of the components must be maintained, and the adhesive may not leach into the oil degrading the electrical or cooling performance of the transformer.

In the manufacture of transformers, a base insulating layer is wrapped around a form, and secured by the adhesive article. A low voltage conductor is attached to the insulating layer, the terminal end of which forms a lead which is protected by an insulating tube (generally a brown paper tube) and secured to the insulating paper layer by the adhesive article. There may be a plurality of alternating low voltage conductor and insulating paper layers depending on the transformer design. The insulating paper layer is often impregnated with an epoxy resin.

Next a first layer of the high voltage conductor is spiral wrapped around the form and a duct spacer sheet is put in place and secured by the adhesive article. The spacer will allow the oil to penetrate into the transformer to help with convective cooling. Additional low voltage conductor layers and corresponding insulating layers can be added depending on the design. The final layer of the low voltage portion will be a layer of insulating paper. Each insulating layer is held in place by additional pieces of the adhesive article.

A first high voltage conductor layer is placed over the insulating layer covering the low voltage portion. Another insulating layer can be added followed by a second layer of high voltage conductive windings is added. Layers a duct spacer can be added to aid in the thermal management of the coil. Each insulating layer is held in place by additional pieces of the adhesive article as well as the anchoring of the conductor in each layer. In some transformers, the conductors close to the edges of the coil can be secured by an additional adhesive article to keep the layers orderly. Additional alternating layers of paper and high voltage conductor are added. Periodically a spacer will be inserted to facilitate thermal management of the transformer.

After winding is complete an outer layer of insulation is wrapped around the coil. The coil is attached the coil to the core and dried in an oven to remove any moisture and cure the epoxy resin (if any). After it has been dried the transformer is put into a can/tank and that is filled with oil.

Therefore in the manufacture of coils, and the subsequent immersion of the coils in an oil-filled transformer present challenges to any adhesive or adhesive article used in the manufacture. The adhesive article must maintain adhesion through the process steps, and further maintain adhesion when immersed in mineral oil and subjected to elevated temperatures. In such environments the adhesive article must be both thermally and chemically stable. Any degradation products can contaminate the oil degrading the electrical properties. Any mechanical failures may lead to debris which can degrade the cooling system of the transformer. Under such conditions the tape should meet two important requirements: show good resistance to oil and minimal contamination of the surrounding oil. A tape shows satisfactory oil resistance or "hold-down" when it remains affixed throughout the lifetime of the transformer. Tape sections that fail to "hold-down" may lift off the coils, float and circulate within the transformer enclosure. Floating sections of tape may obstruct ventilation routes thereby effecting the cooling capacity of the transformer, raising operating temperatures and ultimately shortening the operational lifetime. The second requirement is that the tape should not contaminate the surrounding oil. Contamination may take many forms however the industry has settled on a series of properties listed in ASTM D 3455 "Compatibility of Construction Materials with Electrical Insulating Oil of Petroleum Origin". These properties (see Table A) include dissipation (power factor) at 100° C., oil-water interfacial tension and acid number. While the test methods for determining contamination are listed, it should be noted that the acceptable values or test results are not provided in this ASTM standard.

TABLE A

| Property | ASTM | Units | Doble Sugg. |
|---|---|---|---|
| Dielectric Loss at 100 C. | D 924 | % | 1.0 Max. |
| Interfacial Tension | D 971 | mN/m | ¯35 Min. |
| Acid Number | D 974 | mgKOH/g | .03 Max |
| Dielectric Strength | D 877 | kV | 28 Min. |

In such applications, the backing and any scrim for the adhesive article is desirably mechanically and chemically stable to the oil environment, with Kraft paper or polyester backing and glass fiber scrims being preferred.

EXAMPLES

Materials

| Abbreviation or Trade Name | Description |
|---|---|
| MA | Methyl Acrylate, available from Dow Chemical Company, Midland Michigan |
| BA | Butyl Acrylate, available from BASF Corporation, Vandalia, Illinois. |
| 2-EHA | 2-Ethylhexyl acrylate, available from BASF Corporation, Vandalia, Illinois. |
| 2HEA | 2-hydroxyethyl acrylate, available from BASF Corporation, Vandalia, Illinois. |
| AA | Acrylic Acid, available from BASF Corporation, Vandalia, Illinois. |
| ACM | Acrylamide monomer, available from Mytech, Inc. Burlington, NC |
| IOTG | Isooctyl thioglycolate available from Evans Chemetics LP, Teaneck, New Jersey. |
| EtOAc | Ethyl Acetate, available from Honeywell International, Inc., Morris Plains, New Jersey. |
| VOAc | Vinyl Acetate, available from Celanese Ltd., Irving, Texas. |
| IPA | Isopropyl alcohol was used as a chain transfer agent, available from Whitaker Oil Company, Atlanta, Georgia. |
| Irganox 1010 | Tetrakis(methylene(3,5-di-tert-butyl-4-hydroxyhydrocinnamate))methane, available under the trade designation "Irganox 1010" from BASF Corporation, Vandalia, Illinois. |
| VAZO 52 | 2,2'-Azobis(2,4 dimethylpentanenitrile)), available under the trade designation "VAZO 52" from E. I. du Pont de Nemours and Co., Wilmington, Delaware. |
| VAZO 88 | 1,1'-Azobis(cyanocyclohexane), available under the trade designation "VAZO 88" from E. I. du Pont de Nemours and Co., Wilmington Delaware. |
| VAZO 67 | 2-(2-cyanobutan-2-yldiazenyl)-2-methylbutanenitrile, available under the trade designation "VAZO 52" from E. I. du Pont de Nemours and Co., Wilmington, Delaware. |
| Desmodur L-75 | Aromatic polyisocyanate based on toluluene diisocyanate (75%) in ethyl acetate, available under the trade designation "Desmodur L-75" from Covestro LLC, Pittsburgh, Pennsylvania. |
| MEHQ | 4-Methoxyphenol available from Sigma-Aldrich, St. Louis, Missouri. |
| LUPERSOL 101 | 2,5-Dimethyl-2,5 Di-(t-butylperoxy)hexane, available under the trade designation "LUPERSOL 101" from Elf Atochem North America, Inc., Philadelphia, Pennsylvania. |

-continued

Materials

| Abbreviation or Trade Name | Description |
|---|---|
| B-212 | Bisamide crosslinker, 5% solution (by weight) of 1,1'-isophthaloyl-bis(2-methylaziridine) crosslinker (CAS No. 7652-64-4) in toluene |

Test Methods

Intrinsic Viscosity (IV) Measurement

The inherent viscosities (IV, deciliter/g) were obtained using a Cannon-Fenske #50 viscometer (Cannon Instrument Co., State College, Pa.) in a water bath controlled at 25° C. to measure the flow time of 10 mL of a polymer solution (0.2 g per deciliter polymer in ethyl acetate). The test procedure followed and the apparatus used are described in detail in Textbook of Polymer Science, F. W. Billmeyer, Wiley-Interscience, Second Edition, 1971, pages 84 and 85.

Aged Oil Sample Preparation

Preparation was performed per ASTM 3455 but with smaller sample and oil volume and by using vacuum instead of nitrogen bubbling to dry the oil. Samples were prepared by first charging an 8 oz. glass jar with 100 g of Hyvolt II Electrical Insulating Oil available from Ergon, Inc., Jackson, Miss. Tape samples for ASTM testing were cut to 1 in.×1.25 in. rectangles and placed in a small weighing dish, adhesive side up. Both oil-filled jars and tape samples were placed in a vacuum oven for 12 hours at 65° C. for drying. After the initial 12 hours, the tape samples were dropped into the appropriate oil-filled jar and the oil-tape combinations were further dried in vacuum for 12 hours at 65° C. Upon removal from the oven, the jars were purged with nitrogen gas for 90 seconds, tightly sealed and immediately placed in an air circulating oven at 100° C. After 168 hours, the sample jars were removed from the oven and allowed to attain room temperature without breaking the nitrogen seal.

Dielectric Loss Measurement

Dielectric loss (Tan δ) was recorded per ASTM D 924 on oil samples prepared by ASTM 3455 as described above. Sealed samples were pre-heated to 100° C. Upon reaching the desired temperature, sample jars were opened and approximately 20 ml of hot oil were pipetted into a stainless steel capacitance cell. Capacitance and dissipation factors were measured at 100° C. using a Tettex 2877 Capacitance/Tan Delta Bridge at 60 Hz/400V.

The dielectric loss of aged Hyvolt II Electrical Insulating Oil that was not exposed to an adhesive was found to be 0.00048.

Interfacial Tension Measurement

The water/oil interfacial tension (IFT) were measure on oil samples prepared by ASTM 3455 as described above. The reverse osmosis (RO) water/oil interfacial tension (IFT) was measured per ASTM D 971 using a Cahn Dynamic Angle Analyzer model DCA 315.

The IFT of RO water/air that was found to be 71.5 mN/m

The IFT of RO water/aged Hyvolt II Electrical Insulating Oil that was not exposed to an adhesive was found to be 48.1 mN/m.

Determination of Acid Number

Acid number was tested per ASTM D974 using 20 g oil samples prepared by ASTM 3455 as described above. Titrations were performed with 0.1M potassium hydroxide solution in isopropanol available from Fluka Chemical using p-Naphtholbenzein indicator from Ricca Chemical Company, Arlington, Tex.

The acid number of pristine Hyvolt II Electrical Insulating Oil that was found to be 0.008 mg KOH/g.

Oil Shear Measurement

A 2.5 inch long section of 1 inch wide tape was adhered to two rectangular coupons such that the tape bridged the coupons with a 0.5 inch gap resulting in one square inch of overlap on each coupon. The coupons were made of aluminum. Once the tape was adhered by rolling twice at 12 inch/min. with a 4.5 lb. roller, the assembly was baked in an air circulating oven at 135° C. for two hours. The tape/coupon assemblies were then immersed in transformer oil at 100° C. for 168 hours. After cooling, the tape samples are removed from the oil bath and patted dry. The shear force was recorded as the maximum force to failure as the test coupons are pulled at a rate of 0.2 inch/min. Testing was performed on an MTS Insight 5 Tensile Tester available from MTS Systems Corporation, Eden Prairie, Minn.

Tack Measurement

Tack was measured on pristine adhesive samples per ASTM D2979 using a 5 mm diameter, flat stainless steel probe which was brought into contact with the adhesive and then removed at a constant rate of 10 mm/s. The maximum removal force after 1 second of contact was recorded. All tests were performed on a model PT1000 Tack Probe from Cheminstruments, Inc., Fairfield, Ohio.

Comparative Example 1 (C1)

Using the general procedure of U.S. Pat. No. 7,968,661 (Ellis et al.), 50.0 g of MA, 49.0 g 2-EHA, 1.0 g AA, 0.1 g IOTG, 0.0008 g VAZO 52, 0.10 g Irganox 1010, and 0.02 g MEHQ were combined and an 80 g sample of the mixture was transferred to a stainless steel reactor (VSP2 adiabatic reaction apparatus equipped with a 316 stainless steel test can available from Fauske and Associates Inc, Burr Ridge Ill.). The reactor was sealed and purged of oxygen and then held at approximately 100 psig (793 kPa) nitrogen pressure. The reaction mixture was heated to 62° C. and the reaction proceeded adiabatically.

The sample was cooled and removed from the reactor and an aliquot was removed for analysis. To the remaining 75 g of material, 0.0042 g of VAZO 52 and 0.0267 g of IOTG in 0.7 g of EtOAc were added to the reaction mixture. The mixture was stirred thoroughly and returned to the reactor. The reactor was sealed and purged of oxygen and then held at approximately 100 psig (793 kPa) nitrogen pressure. The reaction mixture was heated to 62° C. and the reaction proceeded adiabatically.

The sample was once again cooled and removed from the reactor. To the reaction mixture, 0.0126 g of VAZO 88 and 0.0042 g of LUPERSOL 101 in 0.7 g of EtOAc were added. The mixture was stirred thoroughly and returned to the reactor. The reactor was sealed and purged of oxygen and then held at approximately 100 psig (793 kPa) nitrogen pressure. The reaction mixture was heated to 150° C., held at this temperature for 1 hour, and then removed from the reactor for analysis. The final material was found to have an IV value of 0.47 dL/g.

The adhesive sample was dissolved in EtOAc for coated on a Kraft paper backing for application testing. Samples were cured by exposure electron beam at a dose of 6 Mrads at 175 kV on both sides.

Example 1

Using the general procedure of U.S. Pat. No. 7,968,661 (Ellis et al.), 50.0 g of MA, 49.0 g 2-EHA, 1.0 g AA, 15.0 g vinyl acetate, 0.08 g IOTG, 0.0012 g VAZO 52, 0.10 g Irganox 1010, and 0.02 g MEHQ were combined together. Then, 80 grams of the mixture was transferred to the stainless steel reactor of Example C1. The reactor was sealed and purged of oxygen and then held at approximately 100 psig (793 kPa) nitrogen pressure. The reaction mixture was heated to 62° C. and the reaction proceeded adiabatically.

The sample was cooled and removed from the reactor and an aliquot was removed for analysis. To the remaining 75 g of material, 0.0045 g of VAZO 52 and 0.215 g of IOTG in 0.7 g of EtOAc were added to the reaction mixture. The mixture was stirred thoroughly and returned to the reactor. The reactor was sealed and purged of oxygen and then held at approximately 100 psig (793 kPa) nitrogen pressure. The reaction mixture was heated to 62° C. and the reaction proceeded adiabatically.

The sample was once again cooled and removed from the reactor. To the reaction mixture, 0.0126 g of VAZO 88 and 0.0042 g of LUPERSOL 101 in 0.7 g of EtOAc were added. The mixture was stirred thoroughly and returned to the reactor. The reactor was sealed and purged of oxygen and then held at approximately 100 psig (793 kPa) nitrogen pressure. The reaction mixture was heated to 150° C., held at this temperature for 1 hour, and then removed from the reactor for analysis. The final material was found to have an IV value of 0.62 dL/g.

The adhesive sample was dissolved in EtOAc then coated on a Kraft paper backing for application testing. Samples were cured by exposure electron beam at a dose of 6 Mrads at 175 kV on both sides.

TABLE 1

Adhesive and Oil Resistant Properties of Solventless Pre-adhesive Compositions

| | | Properties | | | |
|---|---|---|---|---|---|
| Sample | Tan δ | IFT (mN/m) | Oil Shear (lbs) | Acid No. (mgKOH/g) | Tack (g) |
| C1 | 0.0144 | 28.9 | 10.2 | 0.017 | 573 |
| Ex. 1 | 0.0161 | 30.7 | 7.83 | 0.008 | 478 |

Preparation of Solution Copolymers

Individual 4 oz. amber glass bottles were charged in accordance to Table 2. The bottles were purged with nitrogen for 45 seconds, tightly sealed, and polymerized in a waterbath at 65° C. for 24 hours. Following polymerization, samples from C2-C7 and EX. 2-Ex. 5 were diluted to 34% solids with ethyl acetate and the IVs measured. The IV for Sample C8 (39.3% solids) was measured as is.

TABLE 2

Solution polymer formulations in grams charged

| | 2EHA | MA | AA | 2HEA | VOAc | EtOAc | IPA | VAZO 67 |
|---|---|---|---|---|---|---|---|---|
| C2 | 9.9 | 10 | 0.1 | 0 | 0 | 29.8 | 0.2 | 0.12 |
| C3 | 9.8 | 10 | 0.2 | 0 | 0 | 29.8 | 0.2 | 0.12 |
| C4 | 9.6 | 10 | 0.4 | 0 | 0 | 29.8 | 0.2 | 0.12 |
| C5 | 9.8 | 10 | 0.2 | 0 | 0 | 29.4 | 0.6 | 0.12 |

TABLE 2-continued

| | Solution polymer formulations in grams charged | | | | | | | |
|---|---|---|---|---|---|---|---|---|
| | 2EHA | MA | AA | 2HEA | VOAc | EtOAc | IPA | VAZO 67 |
| C6 | 9.6 | 10 | 0.4 | 0 | 0 | 29.4 | 0.6 | 0.12 |
| C7 | 9.6 | 10 | 0 | 0.4 | 0 | 29.8 | 0.2 | 0.12 |
| C8 | 9.8 | 10 | 0.2 | 0 | 0 | 29.0 | 1.0 | 0.12 |
| Ex. 2 | 9.8 | 10 | 0.2 | 0 | 3 | 29.8 | 0.2 | 0.12 |
| Ex. 3 | 11.8 | 8 | 0.2 | 0 | 3 | 29.8 | 0.2 | 0.12 |
| Ex. 4 | 11.8 | 8 | 0.2 | 0 | 3 | 29.4 | 0.6 | 0.12 |
| Ex. 5 | 9.6 | 10 | 0 | 0.4 | 3 | 29.8 | 0.2 | 0.12 |

B-212 Bisamide crosslinker (0.2 wt % with respect to dry polymer) was added to formulations C2-C6, C8 and Ex. 2-Ex. 4, and Desmodur L-75 (2 wt % with respect to dry polymer) was added to formulations C7 and Ex. 5 as a 10% solution in EtOAc. Formulations C2-C7 and Ex. 2-Ex. 5 were diluted to 30% solids with EtOAc. The mixtures were allowed to roll for two hours to ensure that they were well mixed. Each of the samples was knife coated at a 3 mil thickness onto a Kraft paper backing and dried for 30 minutes at 65° C. Standard Loparex 7300A release liner (Loparex, Cary, N.C.) was applied. Selected properties of the resulting adhesive were measure according to the methods provided above and are reported in Table 3.

TABLE 3

Selected adhesive and Oil Resistant Properties of the samples disclosed in Table 2.

| | Properties | | | | | |
|---|---|---|---|---|---|---|
| Example | IV (dL/g) | Tan δ | IFT (mN/m) | Oil Shear (lbs) | Acid No. (mg KOH/g) | Tack (g) |
| C2 | 1.12 | 0.00669 | 37.3 | 0 | | 683 |
| C3 | 1.10 | 0.00864 | 39.6 | 15 | 0.006 | 670 |
| C4 | 1.10 | 0.0084 | 40.9 | 10.8 | | 556 |
| C5 | 1.07 | 0.0103 | 36.6 | 13.7 | 0.006 | 612 |
| C6 | 1.05 | 0.0088 | 41.2 | 14.4 | | 598 |
| C7 | 1.11 | 0.00297 | 32.5 | 9 | 0.011 | 493 |
| C8 | 0.70 | 0.0117 | 33.3 | 11.3 | | 694 |
| Ex. 2 | 1.20 | 0.00408 | 47.1 | 19.3 | 0.006 | 634 |
| Ex. 3 | 1.14 | 0.0103 | 46 | 11.6 | | 575 |
| Ex. 5 | 1.11 | 0.00888 | 45 | 14.8 | | 599 |
| Ex. 6 | 1.11 | 0.00224 | 46.4 | 13.5 | | 375 |

Preparation of Solution Polymers and Adhesives with Different Crosslink Densities Individual 4 oz. amber glass bottles were charged in accordance to Table 3. The bottles were purged with nitrogen for 45 seconds, tightly sealed, and polymerized in waterbath at 60° C. for 22 hours. Following polymerization IV of each polymer was measured as reported.

TABLE 4

| | Solution polymer formulations in grams charged | | | | | | | |
|---|---|---|---|---|---|---|---|---|
| | 2EHA | MA | AA | ACM | VOAc | EtOAc | IPA | VAZO67 |
| Ex. 7 | 42.6 | 43.5 | 0.9 | 0 | 13.0 | 148.5 | 1.5 | 0.15 |
| Ex. 8 | 42.6 | 43.5 | 0.9 | 0 | 13.0 | 148.0 | 2.0 | 0.15 |
| Ex. 9 | 42.6 | 43.5 | 0.9 | 0 | 13.0 | 147.0 | 3.0 | 0.15 |
| Ex. 10 | 42.6 | 43.5 | 0.9 | 0 | 13.0 | 146.0 | 4.0 | 0.15 |
| Ex. 11 | 9.33 | 9.52 | 0.2 | 0 | 0.95 | 29.6 | 0.4 | 0.03 |
| Ex. 12 | 7.84 | 8.00 | 0.16 | 0 | 4.00 | 29.6 | 0.4 | 0.03 |
| Ex. 13 | 8.52 | 8.70 | 0 | 0.17 | 2.61 | 29.6 | 0.4 | 0.03 |

B-212 Bisamide crosslinker was added to Ex. 7-Ex. 13 formulations as described in Table 5. B-212 amount are provided as a weight percent with respect to dry polymer in the solution. All formulations were diluted to 33% solids with EtOAc. The mixtures were allowed to roll for two hours to ensure that they were well mixed. Each of the samples was knife coated at a 3 mil thickness onto a Kraft paper backing and dried for 30 minutes at 65° C. Standard Loparex 7300A release liner (Loparex, Cary, N.C.) was applied. The tape construction of formulation 092015-7 was cured by electron beam using a 6 Mrad dose at 175 kilovolts. The construction was cured on both the adhesive face side, through the silicone liner, and separately, on a second pass, through the Kraft paper backing. Selected properties of the resulting adhesive were measured according to the methods provided above and are reported in Table 4.

TABLE 5

Adhesives formed by crosslinking the solution polymers described in Table 4 and selected adhesive and Oil Resistant Properties of the resulting adhesives

| Samples | IV (dL/g) | Bisamide (wt %) | Tan δ | IFT (mN/m) | Oil Shear (lbs) | Acid No. | Tack (g) |
|---|---|---|---|---|---|---|---|
| Ex. 7a | 1.43 | 0.05 | 0.00243 | 46.8 | 20 | 0.025 | 486 |
| Ex. 7b | 1.43 | 0.1 | 0.00289 | 46.7 | 13.9 | 0.008 | 411 |
| Ex. 7c | 1.43 | 0.2 | 0.00309 | 46.2 | 9.5 | 0.014 | 379 |
| Ex. 8a | 1.26 | 0.05 | 0.0024 | 46.1 | 8.9 | 0.008 | 508 |
| Ex. 8b | 1.26 | 0.1 | 0.00388 | 46.2 | 12.8 | 0.003 | 786 |
| Ex. 8c | 1.26 | 0.2 | 0.00293 | 46.1 | 15.1 | 0.008 | 655 |
| Ex. 9a | 1.09 | 0.4 | 0.00454 | 46.5 | 21.5 | 0.025 | 615 |
| Ex. 9b | 1.09 | 0.1 | 0.00303 | 45.7 | 8.7 | 0.017 | 717 |
| Ex. 9c | 1.09 | 0.2 | 0.00357 | 46.3 | 12.8 | 0.008 | 584 |
| Ex. 10a | 0.95 | 0.4 | 0.00454 | 46 | 17.9 | 0.014 | 564 |
| Ex. 10b | 0.95 | 0.1 | 0.00242 | 45.1 | 9.3 | 0.008 | 485 |
| Ex. 10c | 0.95 | 0.2 | 0.00377 | 45.7 | 9.1 | 0.008 | 665 |
| Ex. 11 | 1.46 | 0.2 | 0.00575 | 45.5 | 12.7 | 0.014 | 637 |
| Ex. 12 | 1.22 | 0.2 | 0.00223 | 46.1 | 16 | 0.017 | 499 |
| Ex. 13 | 1.31 | 0 | 0.00228 | 46.5 | 15.5 | 0.017 | 359 |

What is claimed is:

1. A crosslinked adhesive copolymer composition, the copolymer comprising:
   a) 30 to 60 parts of a (meth)acrylic ester monomer, wherein the (meth)acrylic ester monomer is a monomeric (meth)acrylic ester of a non-tertiary alcohol, which alcohol contains from 2 to 14 carbon atoms,
   b) 40 to 60 parts of methyl acrylate monomer,
   c) 2 to 15 parts of vinyl ester monomers, and
   d) 0.1 to 5 parts of an acid functional monomer,
   where the sum of a) to d) is 100 parts by weight.

2. The crosslinked adhesive composition of claim 1 comprising 5-10 parts by weight of vinyl ester monomers.

3. The crosslinked adhesive composition of claim 1 comprising 0.5-2 parts by weight of the acid functional monomers.

4. The crosslinked adhesive composition of claim 1 wherein the (meth)acrylic ester is a (meth)acrylic ester, wherein the (meth)acrylic ester monomer contains from 4 to 12 carbon atoms.

5. The composition of claim 1 comprising 0.1 to 5 parts of acid functional monomers, said copolymer crosslinked by a bisamide crosslinking agent.

6. The composition of claim 1 comprising 0.1 to 5 parts of acid functional monomers, said copolymer crosslinked by a polyepoxide crosslinking agent.

7. The composition of claim 1 comprising 0.1 to 5 parts of acid functional monomers, said copolymer crosslinked by a multifunctional oxazoline crosslinking agent.

8. The composition of claim 1 wherein the copolymer has an intrinsic viscosity of >0.95 to 1.4 deciliters/g.

9. The composition of claim 1 wherein the acid functional monomer is (meth)acrylic acid.

10. The adhesive copolymer of claim 1 of the formula prior to crosslinking:

$$\sim[M^{ester}]_a\text{-}[M^{MA}]_b\text{-}[M^{VAc}]_c\text{-}[M_D]_d\sim,$$

where
   $[M^{ester}]$ represents (meth)acrylate ester monomer units and subscript is the parts by weight
   $[M^{MA}]$ represent methyl (meth)acrylate monomer units and subscript b is the parts by weight;
   $[M^{VAc}]$ represent vinyl ester monomer units and subscript c is the parts by weight; and
   $[M^D]$ represents one of one of i) acid functional monomers, ii) a (meth)acrylamide monomers or iii) a hydroxyalkyl (meth)acrylate monomers and subscript d represents the parts by weight, the sum of subscripts a to d being 100 parts by weight.

11. The adhesive copolymer of claim 1 wherein the copolymer is prepared by solution polymerization, followed by crosslinking.

12. The adhesive copolymer of claim 1 wherein the copolymer is prepared by solventless polymerization, followed by crosslinking.

13. The adhesive copolymer of claim 1 wherein the copolymer is prepared by syrup polymerization, followed by crosslinking.

14. An adhesive article comprising a layer of the adhesive copolymer of claim 1 on a backing.

15. The adhesive article of claim 14 wherein the backing is paper, polyester or a glass mat.

16. The adhesive article of claim 15 further comprising a glass scrim embedded in the adhesive copolymer layer.

17. An adhesive article of claim 14, wherein the adhesive article is a tape, and wherein, after the tape has been immersed in an oil for 164 hours and 100° C. according to ASTM D3455, the oil has a maximum change in dielectric loss of 1.0%, a minimum oil-water interfacial tension of 35 mN/M, a maximum acid number of 0.03 mg KOH/g, and a minimum dielectric strength of 28 kV.

* * * * *

UNITED STATES PATENT AND TRADEMARK OFFICE
CERTIFICATE OF CORRECTION

PATENT NO. : 10,947,423 B2
APPLICATION NO. : 16/080320
DATED : March 16, 2021
INVENTOR(S) : Rosner et al.

It is certified that error appears in the above-identified patent and that said Letters Patent is hereby corrected as shown below:

In the Specification

Column 3,
Line 43, delete "$R_1$" and insert -- $R^1$ -- therefor.

Column 6,
Line 7, delete "R'''" and insert -- $R^{14}$ -- therefor.

In the Claims

Column 19,
Line 36, Claim 10 delete "$[M_D]_d\sim$" and insert -- $[M^D]_d\sim$ -- therefor.

Signed and Sealed this
Thirty-first Day of August, 2021

Drew Hirshfeld
*Performing the Functions and Duties of the
Under Secretary of Commerce for Intellectual Property and
Director of the United States Patent and Trademark Office*